Patented Jan. 2, 1951

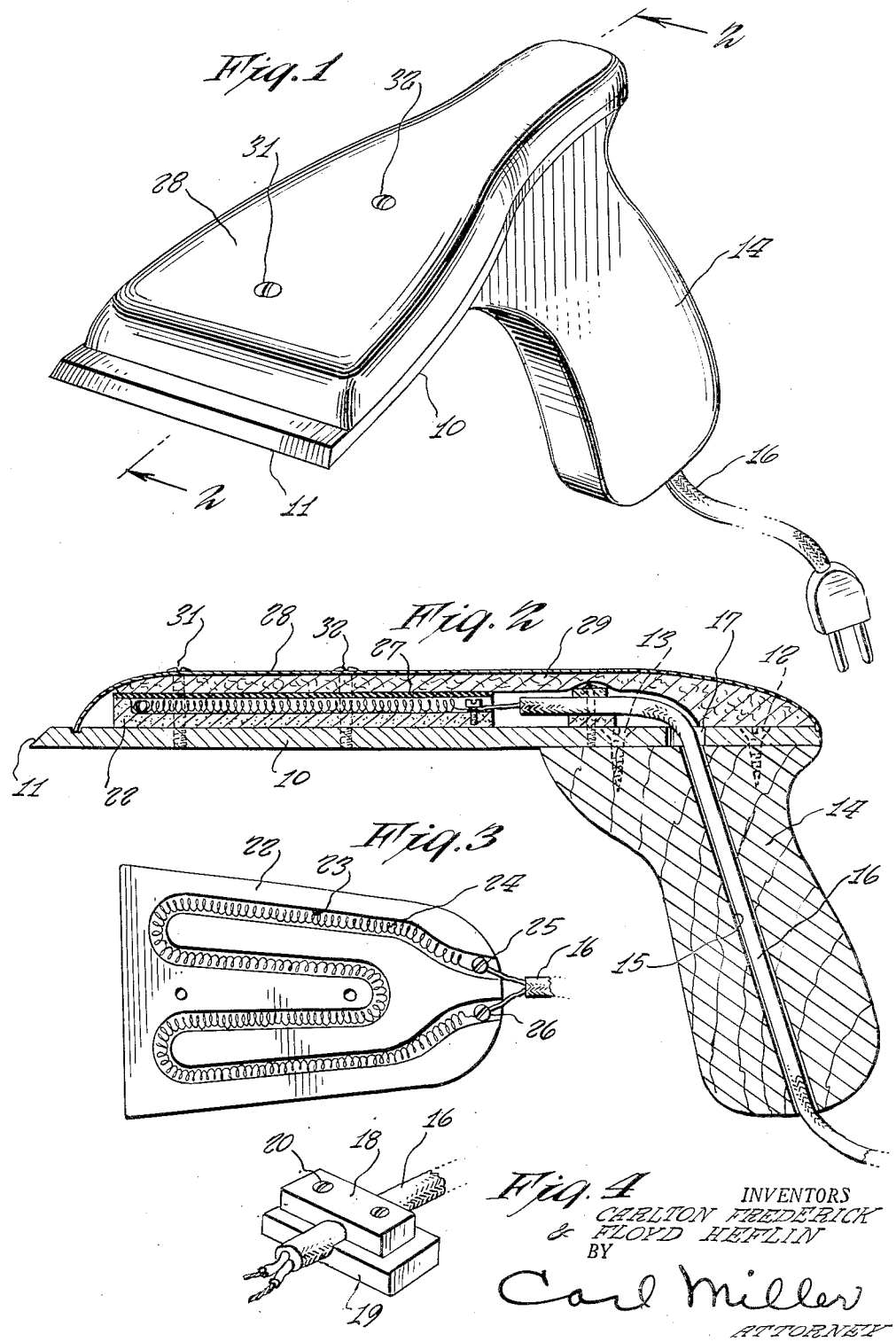

2,536,844

UNITED STATES PATENT OFFICE 2,536,844

THERMAL SCRAPER

Carlton Frederick and Floyd Heflin,
Cleveland, Ohio

Application August 25, 1949, Serial No. 112,306

1 Claim. (Cl. 219—21)

This invention relates to a thermal scraper.

It is an object of the present invention to provide an element in a scraping member so as to keep the material being scraped in a heated condition as well as the knife so that the material can be easily taken from the scraping knife and kept heated without the need of a torch.

Other objects of the present invention are to provide a heated scraper which is of simple construction, inexpensive to manufacture, less fatiguing to operate than other methods, increases the worker's output, compact, has a minimum number of parts, rugged, convenient to use and efficient in operation.

For other objects and for a better understanding of the invention, reference may be had to the following detailed description taken in connection with the accompanying drawing, in which Fig. 1 is a perspective view of the scraper embodying the features of the present invention.

Fig. 2 is a longitudinal sectional view taken generally on line 2—2 of Fig. 1.

Fig. 3 is a plan view of the heating element with the parts thereof separated to show the location of the heating element within one of the parts.

Fig. 4 is a perspective view of one of the clamping blocks for the cord disposed within the casing.

Referring now to the figures, 10 represents a steel scraping plate having a sharp edge 11 thereon. This plate is wide at its scraping edge and tapers rearwardly. The rear end of this plate is connected by large screws 12 and 13 to a handle 14. The handle 14 has an opening 15 extending through the same through which a cable cord 16 extends. This cable cord extends through a hole 17 in the end of the plate and is secured by clamping elements 18 and 19 and clamping screws 20 upon the top face of the scraping plate 10.

The heating unit comprising a heat resisting plate 22 with a serpentine shaped groove 23 therein and a heating wire 24 connected through screws 25 and 26 with the cable wires. This plate 22 can be secured to the top face of the plate 10. An insulated covering plate 27 is secured thereover. Over this unit there is disposed a metal box-like cover 28 which is filled with asbestos or other insulating or fire proof material and as indicated at 29. This cover is secured by screws 31 and 32 extending through the plate 27 and the part 22 and into the metal scraper plate 10.

The plate 27 is formed of mica. The part 22 will be heated and while at the same time providing an insulation for the wire will also impart heat to the blade or scraper plate 10 and over a large area thereof. Any of the scraped material tending to gather upon the exterior surface of the plate 10 will be readily melted and kept in such a condition that the plate can be easily freed of it and the plate and scraping edge always kept clean and will not have to be continually wiped with a rag or made free of the scraped material. The scraper is accordingly economical to operate, less fatiguing and the output of the worker will be greatly increased. It is much safer than a torch for the removal of the coating material.

While various changes may be made in the detail construction, it shall be understood that such changes shall be within the spirit and scope of the present invention as defined by the appended claim.

Having thus set forth and disclosed the nature of our invention, what is claimed is:

A thermal scraper comprising a scraping plate having a scraping edge thereupon, said scraper plate having a rearwardly extending tapered portion, a handle secured to the bottom face of the scraping plate and projecting normal thereto, said handle having an opening therein, a cable cord extending through the opening of the handle and of the scraper plate, a heating element disposed over a large portion of the top face of said scraper plate, means for securing said heating element to the top face of said scraper plate including insulating material extending over the heating element, a cover disposed over said insulating material and fastening screws extending through said cover, said insulating material and the heating unit and being screwed to said scraping plate.

CARLTON FREDERICK.
FLOYD HEFLIN.

REFERENCES CITED

The following references are of record in the file of this patent:

UNITED STATES PATENTS

| Number | Name | Date |
|---|---|---|
| 1,610,932 | Cooper | Dec. 14, 1926 |
| 1,881,241 | Potensa | Oct. 4, 1932 |
| 2,033,327 | Coffelt | Mar. 10, 1936 |
| 2,263,222 | Morris | Nov. 18, 1941 |
| 2,297,103 | Holm | Sept. 29, 1942 |

FOREIGN PATENTS

| Number | Country | Date |
|---|---|---|
| 322,418 | Great Britain | Dec. 5, 1929 |
| 540,510 | Great Britain | Oct. 20, 1940 |